US012763722B1

(12) United States Patent
Al-Zahrani et al.

(10) Patent No.: US 12,763,722 B1
(45) Date of Patent: Oct. 13, 2026

(54) OPTICAL VACUUM DOME FOR SOLAR PANELS

(71) Applicant: Imam Abdulrahman Bin Faisal University, Dammam (SA)

(72) Inventors: Mussad Mohammed Al-Zahrani, Dammam (SA); Mohamed Lamjed Youssef Bouazizi, Dammam (SA); Mohammed Omar Abdulaziz Al Sunbul, Dammam (SA); Mohammed Abdulmohsen Al Hassen, Dammam (SA); Abdullatif Bandar Mohammed Al Habah, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 0 days.

(21) Appl. No.: 19/283,591

(22) Filed: Jul. 29, 2025

(51) Int. Cl.
*H02S 40/22* (2014.01)

(52) U.S. Cl.
CPC .................................... *H02S 40/22* (2014.12)

(58) Field of Classification Search
CPC ....................................................... H02S 40/22
See application file for complete search history.

(56) References Cited

FOREIGN PATENT DOCUMENTS

| | | | | |
|---|---|---|---|---|
| CN | 114553117 A | * | 5/2022 |
| GB | 2562751 A | * | 11/2018 |
| JP | 2006-93256 A | | 4/2006 |
| JP | 2014-93485 A | | 5/2014 |
| JP | 2014093485 | * | 5/2014 |
| KR | 10-2015-0049844 A | | 5/2015 |

OTHER PUBLICATIONS

Andreas Gombert, et al., "Photonics in photovoltaic systems", Phys. Stat. Sol. (a), vol. 205, No. 12, Nov. 18, 2008, pp. 2757-2765.
Duc Tu Vu, et al., "Cylindrical Fresnel lens: an innovative path toward a tracking-less concentrating photovoltaics system", Solar Energy, vol. 234, Feb. 12, 2022, pp. 251-261.

* cited by examiner

*Primary Examiner* — Jayne L Mershon
(74) *Attorney, Agent, or Firm* — Oblon, McClelland, Maier & Neustadt, L.L.P.

(57) ABSTRACT

A high-concentrating photovoltaic system that includes a photovoltaic panel and an array of dome-shaped lenses disposed above a light-gathering face of the photovoltaic panel. Each dome-shaped lens includes a flat base and a domed upper portion defining a lens interior, each lens interior is air-tight and contains a gas at a pressure of from greater than 0 kilo Pascals (kPa) to 25 kPa. Further, each dome-shaped lens is formed of a glass and the array is a rectangular array having an inter-lens spacing between each adjacent dome-shaped lens.

20 Claims, 9 Drawing Sheets

OPTICAL VACUUM DOME FOR SOLAR PANELS

BACKGROUND

Technical Field

The present disclosure relates to a photovoltaic system incorporating optical concentrators and thermal regulators.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

Energy demands have increased multi-fold over the past decades. In order to meet energy demands, various renewable energy sources have been explored. Solar energy is a promising renewable energy source with a relatively economical production and low maintenance costs. However, solar energy production faces certain challenges. One of the core technical challenges in photovoltaic (PV) energy generation lies in the limited energy conversion efficiency of solar panels under real-world environmental conditions. The output power of conventional photovoltaic modules is directly dependent on a variety of factors, including the intensity and angular distribution of the incident solar radiation and the operating temperature of the photovoltaic cells. In practical deployment scenarios, such as rooftop and utility-scale installations ("solar farms"), these factors can vary widely and are often suboptimal. For example, the sun's position changes throughout the day and throughout the year, changing the energy per unit area available for the photovoltaic, varying atmospheric conditions such as cloud cover may turn direct sunlight into diffuse light, or thermal accumulation within the module my decrease the power generation efficiency. Reduced irradiance particularly under diffuse or scattered light and elevated cell temperatures may lead to substantial efficiency losses, lowering the overall energy yield and increasing the levelized cost of electricity.

In order to address the challenge of insufficient irradiance capture, optical concentration techniques have been explored. The optical concentration techniques include additional structures such as Fresnel lenses, parabolic mirrors, compound parabolic concentrators (CPCs), and light-guide-based concentrators. Such systems aim to focus sunlight onto a reduced PV surface area and subsequently increase power density and, in some cases, allow use of higher-efficiency photovoltaic materials. Further, conventional solutions for mitigating temperature rise include both passive and active cooling approaches. Passive cooling methods typically involve thermally conductive back sheets, ventilated enclosures, heat-spreading layers, and phase-change materials. Active methods may include fluid-based cooling circuits, thermoelectric coolers, or forced air systems, each aimed at maintaining the PV cells within their optimal temperature operating range.

However, current solutions present a number of practical and technical drawbacks. Concentration-based optical systems often suffer from a limited acceptance angle and therefore require precise sun-tracking mechanisms to maintain alignment with the solar vector, which negate a primary benefit of concentrator systems. The sun tracking systems introduce mechanical complexity, increase installation and maintenance costs, and may compromise system reliability over time. Further, these tracking systems themselves require power to run, which can reduce and even totally negate their benefit. Moreover, concentrated solar irradiation may exacerbate thermal stress within the panel, leading to reduced efficiency and potential long-term material degradation. The use of external cooling systems, while effective in certain configurations, may introduce parasitic energy consumption, add significant weight and volume (thereby exacerbating issues with solar tracking systems), and present integration challenges in rooftop and modular applications.

Importantly, these existing approaches are optimized primarily for direct sunlight and perform poorly under diffused or scattered lighting conditions common in hazy, cloudy, or urban environments, significantly limiting effectiveness thereof in a broad range of geographic and atmospheric conditions. Additionally, solutions relying on nanostructured surfaces or specialized materials may face challenges in terms of large-scale manufacturability, cost-effectiveness, and long-term durability under prolonged exposure to UV radiation, temperature cycling, and environmental particulates.

Hence, there remains a requirement in the art for a simplified, integrated optical-thermal management solution that may passively improve irradiance capture and simultaneously reduce thermal load on the photovoltaic module.

Accordingly, an object of the present disclosure is to provide a high concentrating photovoltaic system that may circumvent the aforementioned drawbacks and limitations of systems already existing in the art.

SUMMARY

According to a first aspect, the present disclosure relates to a high-concentrating photovoltaic system. In some embodiments, the system includes a photovoltaic panel and an array of dome-shaped lenses disposed above a light-gathering face of the photovoltaic panel. In some embodiments, each dome-shaped lens includes a flat base and a domed upper portion defining a lens interior, each lens interior is air-tight and contains a gas at a pressure of from greater than 0 kiloPascals (kPa) to 25 kPa.

In some embodiments, each lens interior contains a gas at a pressure of from greater than 0 to 10 kPa.

In some embodiments, the flat base and domed upper portion each have a thickness of 2 millimeters (mm) to 10 mm.

In some embodiments, each dome-shaped lens has a dome height of 40 mm of 70 mm as measured from a bottom surface of the flat base.

In some embodiments, the array is a rectangular array having an inter-lens spacing between each adjacent dome-shaped lens of 0.5 mm to 5 mm.

In some embodiments, each dome-shaped lens includes a straight wall disposed between the flat base and the domed upper portion about a periphery of the flat base such that the domed upper portion is separated from the flat base by a height of the straight wall.

In some embodiments, the height of the straight wall is 5 mm to 25 mm.

In some embodiments, the array has a peripheral gap between an array periphery and a photovoltaic panel frame.

In some embodiments, the peripheral gap has a gap size of 8 mm to 30 mm.

In some embodiments, the system has a power density of 110% to 200% of a power density of the photovoltaic panel without the array of dome-shaped lenses at a temperature of 45 degree Celsius (° C.) to 75° C.

In some embodiments, the system has a concentration ratio of 1.25 to 7.5 suns.

In some embodiments, the array includes 5 to 20 dome-shaped lenses disposed along a length of the array.

In some embodiments, the array includes 2 to 10 dome-shaped lenses disposed along a width of the array.

In some embodiments, the array has a length to width ratio of 1:1 to 3:1.

In some embodiments, the array of dome-shaped lenses is disposed above the light-gathering face of the photovoltaic panel to form a bottom gap between a bottom surface of the flat base and an upper surface of the light-gathering face.

In some embodiments, the bottom gap has a size of 1 to 7.5 mm.

In some embodiments, each dome-shaped lens has an anti-soiling coating disposed on an exterior surface of the dome-shaped lens.

In some embodiments, the anti-soiling coating comprises an organosilane.

In some embodiments, each dome-shaped lens is formed of a glass.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1A:
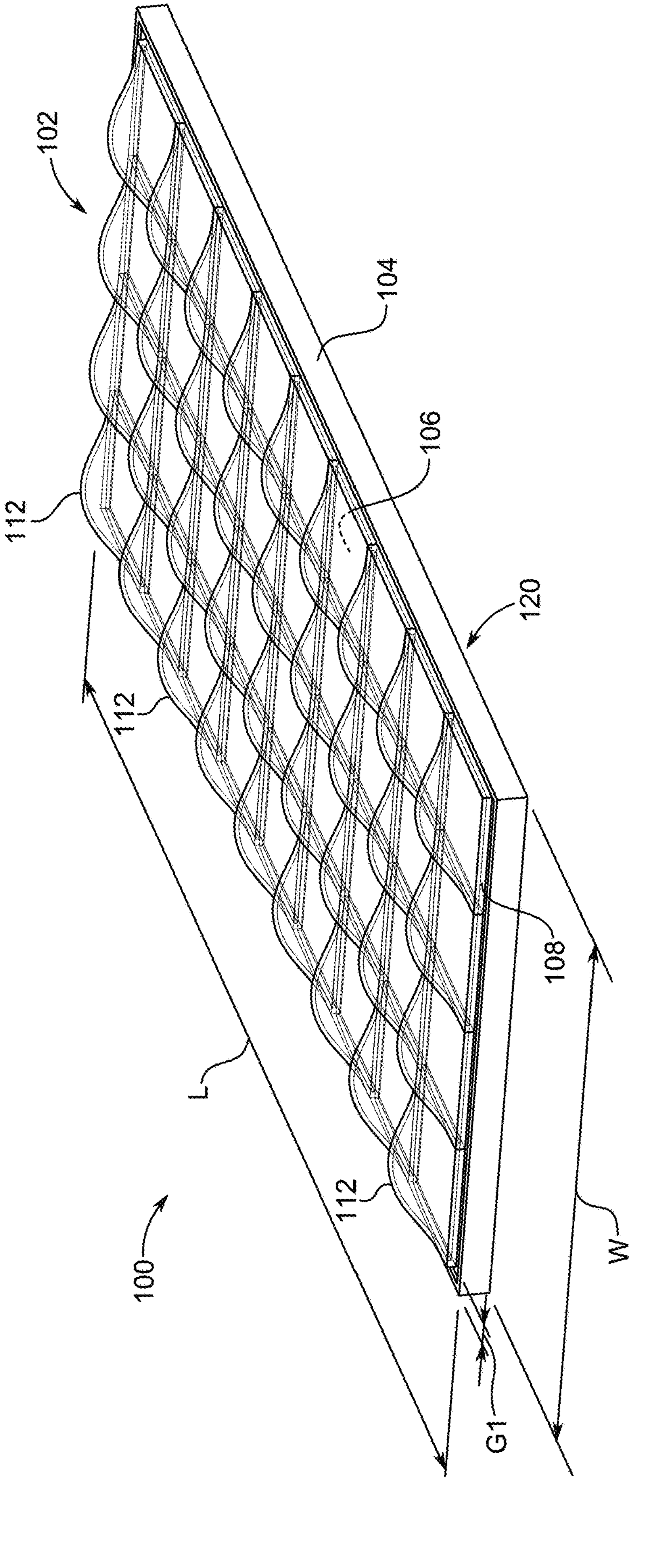
FIG. 1A illustrates an exemplary schematic perspective view of a high-concentrating photovoltaic system, according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein in the context of a concentration ratio, "sun" refers to a standardized measure of the intensity of sunlight where 1 sun corresponds to a standard illumination conditions of sunlight at air mass 1.5 (AM 1.5). The aforementioned standard represents the sunlight intensity after the sunlight has passed through a specific amount of the atmosphere of the Earth. Numerically, 1 sun is approximately equal to 1 kilowatt per square meter (1 $kW/m^2$).

Figure 1B:
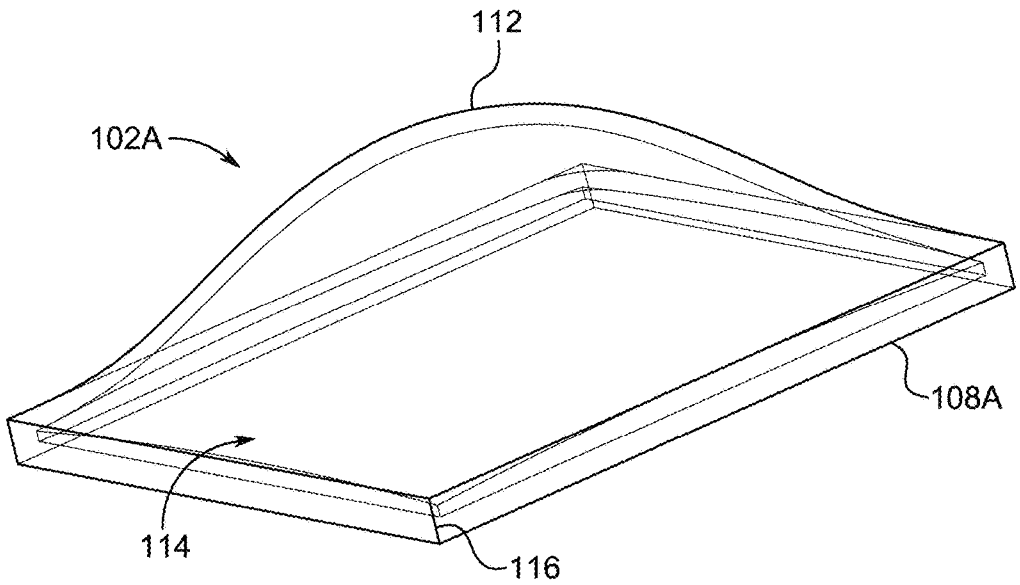
FIG. 1B illustrates an exemplary schematic perspective view of an individual dome-shaped lens incorporated in the high-concentrating photovoltaic system, according to certain embodiments.

Referring to FIG. 1A, a schematic perspective view of a high-concentrating photovoltaic system 100 is illustrated, according to certain embodiments. The high concentrating photovoltaic system 100 is interchangeably referred to as the "system 100" hereinafter, for the sake of brevity in explanation. As shown FIG. 1A, in some embodiments, the high-concentrating photovoltaic system 100 includes an array of dome-shaped lenses 102, alternatively referred to as the "array 102" hereinafter. In addition, FIG. 1B illustrates a schematic perspective view of an individual dome-shaped lens 102A incorporated in the array of dome-shaped lenses 102, according to certain embodiments. In some embodiments, system 100 includes photovoltaic panel 104, which is configured to receive incident sunlight thereupon, and convert absorbed solar energy from the incident sunlight into electrical power.

In general, the photovoltaic panel can include or be constructed using any suitable photovoltaic material known to one of ordinary skill in the art. In some embodiments, the photovoltaic panel 104 may include one or more solar cells that include or are formed of semiconductor materials such as monocrystalline silicon, polycrystalline silicon, and gallium arsenide (GaAs), cadmium telluride (CdTe), copper indium gallium selenide (CIGS)/copper indium selenide (CIS), and the like.

In some embodiments, the photovoltaic panel can include a plurality of photovoltaic elements. The photovoltaic elements can be formed of the photovoltaic material. In some embodiments, the plurality of photovoltaic elements can be arranged into a photovoltaic element array. In general, the photovoltaic element array can have any suitable shape. In some embodiments, the photovoltaic element array may be rectangular, triangular, circular, cylindrical, or polygonal. In some embodiments, the photovoltaic element array is rectangular. In some embodiments, the photovoltaic element array can include 5 to 20 photovoltaic elements disposed along a length and 2 to 10 photovoltaic elements disposed along a width of the photovoltaic element array. For example, a smaller array might include 5 photovoltaic elements along the length and 3 photovoltaic elements along the width (5×3). A larger configuration may include 15 photovoltaic elements along the length and 8 photovoltaic elements along the width (15×8). Other exemplary photovoltaic element array sizes may include, but are not limited to, 10×5, 20×10, 8×4, or 12×6 configurations, and other configurations having a length and width falling within these disclosed ranges.

In some embodiments, an overall length-to-width ratio of the photovoltaic element array lenses may range from 1:1 (square) to 3:1. An array with a 1:1 ratio may include, for example, 10 photovoltaic elements along the length and 10 photovoltaic elements along the width (10×10). A photovoltaic element array exhibiting a 2:1 ratio may include 12 photovoltaic elements along the length and 6 photovoltaic elements along the width (12×6). A photovoltaic element array approaching a 3:1 ratio may include 18 photovoltaic elements by 6 photovoltaic elements (18×6).

In some embodiments, the photovoltaic panel 104 may be encapsulated within a protective layer. Such a protective lay may be advantageous for providing structural support and environmental protection against moisture, dust, and mechanical impact. In general, the protective layer can be constructed of any suitable transparent material, such as tempered glass or transparent polymer. In some embodiments, the photovoltaic panel 104 may include an anti-reflective coating applied to a light-gathering face. Such an anti-reflective coating may be advantageous for reducing reflection losses and/or improving light absorption efficiency.

In some embodiments, the photovoltaic panel 104 may further include a back sheet. The back sheet can be useful for providing electrical insulation and/or thermal insulation or stability. In some embodiments, the back sheet can be composed of or include any suitable material that provides electrical and/or thermal insulation. Examples of materials which can be used in the back sheet include, but are not limited to polyvinyl fluoride (PVF) and polyethylene terephthalate (PET). In some embodiments, the back sheet can be composed of or include any suitable material that is thermally conductive. Examples of such materials include aluminum, steel, and other metals. A thermally conductive back sheet may be advantageous for thermal regulation and/or heat dissipation.

In some embodiments, the photovoltaic panel 104 may be mounted on a rigid support structure. The rigid support structure may be advantageous for facilitating secure installation and/or maintaining alignment with the incident sunlight. In some embodiments, the rigid support structure can take the form of a frame disposed about a periphery of the photovoltaic panel. In general, the rigid support structure can be constructed of any suitable rigid material. In some embodiments, the rigid material can be a metal, such as steel, aluminum, or an alloy thereof. In some embodiments, the rigid support structure includes an aluminum frame. In some embodiments, the photovoltaic panel may be enclosed in a casing. The casing may be configured to enclose all the components of the photovoltaic panel. In some embodiments, the casing may include a top frame and a bottom frame. In some embodiments, the top frame surrounds the array of photovoltaic elements at a periphery of the array. In some embodiments, the bottom frame surrounds a periphery of the back sheet. In some embodiments, the top frame and the bottom frame are separated by a plurality of supports (side walls).

In general, the photovoltaic panel 104 can include various electrical components known to those skilled in the art. Such components can include, but are not limited to bypass diodes, fuses, breakers, and electrical interconnections. Such features may be useful to mitigate power losses caused by partial shading or cell-level failures. In general, the photovoltaic panel can have the photovoltaic elements wired in any suitable configuration, such as series, parallel, or a combination of these.

Additionally, the photovoltaic panel 104 may be operatively coupled to a power management system, including inverters, maximum power point tracking (MPPT) controllers, and energy storage devices, to regulate and distribute the generated electrical energy for grid integration or stand-alone applications. The configuration of the photovoltaic panel 104 may vary based on factors such as the desired electrical output, environmental conditions, and installation constraints, with optional features including bifacial designs for capturing reflected sunlight and tracking mechanisms for maximizing solar exposure.

In some embodiments, the high-concentrating photovoltaic system 100 includes the array of dome-shaped lenses 102 positioned above a light-gathering face 106 of the photovoltaic panel 104. In some embodiments, each dome-shaped lens is arranged such that each dome-shaped lens is positioned in optical alignment above one or more corresponding photovoltaic elements of the photovoltaic panel 104. Such alignment may be advantageous to maximize solar energy capture and concentration efficiency.

In some embodiments, each dome-shaped lens of the array of dome shaped lenses 102 includes a flat base 108, configured to interface with a domed upper portion 112 defining an enclosed lens interior 114.

In some embodiments, the domed upper portion 112 may be formed of an optically transparent material. The optically transparent material may be selected for high transmittance across the solar spectrum and durability under prolonged solar irradiation. Examples of suitable optically transparent materials include, but are not limited to borosilicate glass, quartz, fused silica, poly(methyl methacrylate) (PMMA), or optical-grade polycarbonate. In some embodiments, each dome-shaped lens is formed of a glass. Suitable types of glass include, but are not limited to, borosilicate glass, soda-lime glass, or other glass formulations known for good optical transparency in the solar spectrum, durability, and resistance to environmental degradation such as UV radiation and temperature fluctuations. The choice of glass may be based on factors like cost, refractive index, thermal expansion coefficient, and manufacturing feasibility. Forming the dome-shaped lenses 102 from glass may be advantageous for rigidity and long-term stability for maintaining the domed shape and the low-pressure gas environment therein.

In some embodiments, a shape of the domed upper portion 112 may be hemispherical, ellipsoidal, hyper-hemispherical, or parabolic. In some embodiments, the specific shape of the domed upper portion may be configured to achieve a solar concentration ratio in the range of approximately 1.5 to 5 suns, depending on factors such as the curvature profile and refractive index of the lens material.

In some embodiments, each lens interior 114 as defined by the flat base 108 and the domed upper portion 112 is airtight. In some embodiments, each lens interior 114 contains a gas at a pressure of from greater than 0 kilopascals (kPa) up to 25 kPa. For example, the gas pressure inside the lens interior can be 1 kPa, 2.5 kPa, 5 kPa, 7.5 kPa, 10 kPa, 12.5 kPa, 15 kPa, 17.5 kPa, 20 kPa, 22.5 kPa, or 25 kPa. In some embodiments, the gas may include ambient air, nitrogen, argon, and other inert gases, The specific identity of the gas may be selected to suppress convective heat transfer and maintain optical clarity and pressure stability. Further, the internal pressure may be maintained at sub-atmospheric conditions such as at a pressure of about 5 kPa to 20 kPa, to form a partial vacuum for minimizing conductive and convective thermal losses from the photovoltaic panel and improved light-trapping efficiency due to reduced refractive index mismatches.

In some embodiments, each dome-shaped lens of the array of dome-shaped lenses 102 has a length-to-width ratio ranging from 1:1 to 3:1. In particular, a 1:1 ratio corresponds to a square base. Ratios greater than 1:1 correspond to elongated shapes, such as rectangular bases. In an example, lenses with a rectangular base having a length-to-width ratio of 1.5:1 or 2:1 may be employed to better match the geometry of underlying rectangular photovoltaic cells, potentially improving light capture efficiency onto the light-gathering face 106. Lenses with ratios of 1:1, 1.2:1, 2.5:1, or 3:1 are all contemplated within this range. In some embodiments, each dome-shaped lens has a length of about 148 mm to about 156 mm. For example, the length may be 148 mm, 149 mm, 150 mm, 151 mm, 152 mm, 153 mm, 154 mm, 155 mm, or 156 mm.

In some embodiments the flat base 108 has a thickness 'T1'. In some embodiments, the thickness T1 may range from about 2 to about 10 mm. For example, the thickness T1 of the flat base 108 may be 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm.

In some embodiments, the domed upper portion 112 has a thickness 'T2'. In some embodiments, the thickness T2 may range from about 2 to about 10 mm. For example, the thickness T2 of the domed upper portion 112 may be 2.0 mm, 2.5 mm, 3.0 mm, 3.5 mm, 4.0 mm, 4.5 mm, 5.0 mm, 5.5 mm, 6.0 mm, 6.5 mm, 7.0 mm, 7.5 mm, 8.0 mm, 8.5 mm, 9.0 mm, 9.5 mm, or 10.0 mm.

In general, the thickness T1 of the flat base 108 and the thickness T2 of the domed upper portion 112 may be independent of each other. For example, in one embodiment, the flat base 108 may have a thickness of approximately 3 mm, while the domed upper portion 112 may have a thickness of approximately 2.5 mm.

The thickness T1 of the flat base 108 and the thickness T2 of the domed upper portion 112 may be selected based on factors such as weight, cost, impact resistance, and light transmission. These thicknesses may be selected, for example, to provide desirable rigidity, to minimize material usage, to minimize optical absorption, to maintain structural integrity under the internal low-pressure condition and external environmental factors, or some combination of these.

In some embodiments, each domed-shape lens of the array of the domed-shaped lenses 102 has a dome height 'D' of about 40 mm to 70 mm. For example, the dome height D may be 40.0 mm, 42.5 mm, 45.0 mm, 47.5 mm, 50.0 mm, 52.5 mm, 55.0 mm, 57.5 mm, 60.0 mm, 62.5 mm, 65.0 mm, 67.5 mm, or 70.0 mm. The dome height D may be measured from the bottom surface 108A of the flat base 108 to an apex of the domed upper portion 112. The dome height D may influence focal length and concentration characteristics of the each domed-shape lens.

In some embodiments, each dome-shaped lens includes a straight wall 116 positioned between the flat base 108 and the domed upper portion 112. In some embodiments, the straight wall 116 extends about a periphery of the flat base 108 such that the domed upper portion 112 is separated from the flat base 108 by a height 'H' of the straight wall 116. The straight wall 116 may be advantageous for providing structural separation between the domed upper portion 112 and the flat base 108 and/or defining the lens interior 114 that is maintained at the specified low-pressure range (greater than 0 kPa and up to 25 kPa). In some embodiments, the straight wall 116 may be constructed from a suitable optically transparent material as described above. The use of optically transparent material may be advantageous to ensure minimal optical loss and/or high mechanical durability. In some embodiments, the straight wall 116 is constructed of a non-transparent material, such as a non-transparent polymer, metal, or some other material. In some embodiments, the height of the straight wall 116 can be determined based on desired focal properties and concentration ratio, which may range between 1.5 to 5 suns. In some embodiments, the height of the straight wall 116 is configured within a range of 5 mm to 25 mm. For instance, the height of the straight wall 116 may be 5 mm, 7.5 mm, 10 mm, 12.5 mm, 15 mm, 17.5 mm, 20 mm, 22.5 mm, or 25 mm. The height of the straight wall may vary depending on the overall design and assembly requirements of the system 100. The straight wall 116 may be advantageous for allowing for controlled optical refraction and reduced unwanted chromatic aberration and angular misalignment while directing concentrated sunlight onto the photovoltaic panel 104 in a uniform manner.

In some embodiments, an inner surface of the straight wall 116 may include a coating to improve light guiding properties. Such coatings may include anti-reflective coatings (ARCs), hydrophobic coatings to reduce dust accumulation, or wavelength-selective filters to optimize spectral transmission suited to the photovoltaic absorption characteristics. The presence of the straight wall 116 may be advantageous for edge sealing, preventing moisture ingress or gas leakage from the lens interior 114, which may enhance environmental durability and operational longevity.

In order to maintain optical efficiency over time, particularly in outdoor environments, the lenses may incorporate features to mitigate soiling. In some embodiments, each lens of the array of dome-shaped lenses 102 includes an anti-soiling coating disposed on an exterior surface of the array of dome-shaped lenses 102. In some embodiments, the anti-soiling coating is disposed on the upper, exposed surface of the domed portion. The anti-soiling coating is designed to reduce the accumulation of dust, dirt, pollen, and other contaminants. The anti-soiling coating may function by providing a hydrophobic or hydrophilic surface that facilitates cleaning by rain or wind. In some embodiments, the anti-soiling coating may include or be formed from an organosilane compound. In general, organosilanes may be formulated to create durable, transparent coatings with predetermined surface properties such low surface energy that may resist adhesion of particulate matter and/or facilitate a removal thereof. Furthermore, suitable organosilanes and methods (spray coating, dip coating, chemical vapor deposition) for application thereof may be adapted for coating the exterior surfaces of the array of dome-shaped lenses 102. The application of such an organosilane-based anti-soiling coating may be advantageous for helping sustain the high light transmission required for efficient operation of the high-concentrating photovoltaic system 100.

In general, a dome-shaped lens and/or the array of dome-shaped lenses 102 may be manufactured via any suitable technique or combination of techniques. Examples of suitable such techniques include, but are not limited to precision glass molding, injection molding, and 3D printing with subsequent curing, and may incorporate nanostructured textures or embedded microlenses or microlens arrays. In some embodiments, the lens interior 114 is formed during fabrication by enclosing the gas within a dome cavity at the desired pressure and hermetically sealing the base using, for example, laser welding, UV-curable adhesives, or thermal fusion bonding techniques.

In some embodiments, the array of dome-shaped lenses 102 may be modular. That is, the array is formed of individual dome-shaped lenses. Such individual dome-shaped lenses can be movable, removable, and/or replaceable. This may be advantageous for allowing the array to be reconfigured, and/or allowing an individual dome-shaped lens to be repaired or replace. For example, an individual dome-shaped lens may require pressure adjustment or full replacement after cracking. By allowing for only the cracked lens to be replaced, the cost of repairing the array can be greatly reduced. In some embodiments, flexible sealing interfaces such as silicone-based gaskets or perfluoro elastomers may be employed between the individual dome-shaped lenses. Such gaskets or elastomers may be advantageous to accommodate differential thermal expansion between the array of dome shaped lenses 102 and the photovoltaic panel 104. This may be particularly advantageous in applications or areas subjected to extreme temperature cycling.

In some embodiments, the flat base 108 of each dome-shaped lens may be bonded directly onto a transparent encapsulant or glass layer positioned above the photovoltaic elements incorporated in the photovoltaic panel 104. In some embodiments, the flat base 108 may be mechanically spaced from the photovoltaic elements using micro structured pillars, adhesive beads, or thermoplastic elastomeric rings to maintain structural integrity and optical alignment.

In some embodiments, a waveguide layer may be disposed between the array of dome-shaped lenses 102 and the photovoltaic panel 104. In general, the waveguide layer can be formed of any suitable high-transparency material capable of acting as a waveguide for visible light. Examples of such materials include, but at not limited to, polymethylpentene (TPX), fluorinated ethylene propylene (FEP), and doped silica glass. The waveguide layer may be structured to direct and laterally redistribute incident light through total internal reflection or scattering.

Figure 1C:
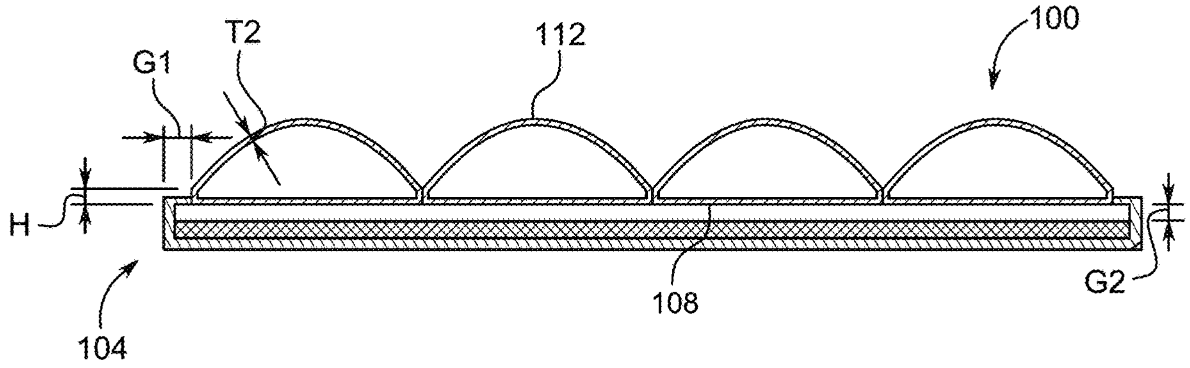
FIG. 1C illustrates a schematic side cross-sectional view of an array of dome-shaped lenses disposed on top of a photovoltaic panel, according to certain embodiments.
Figure 1D:
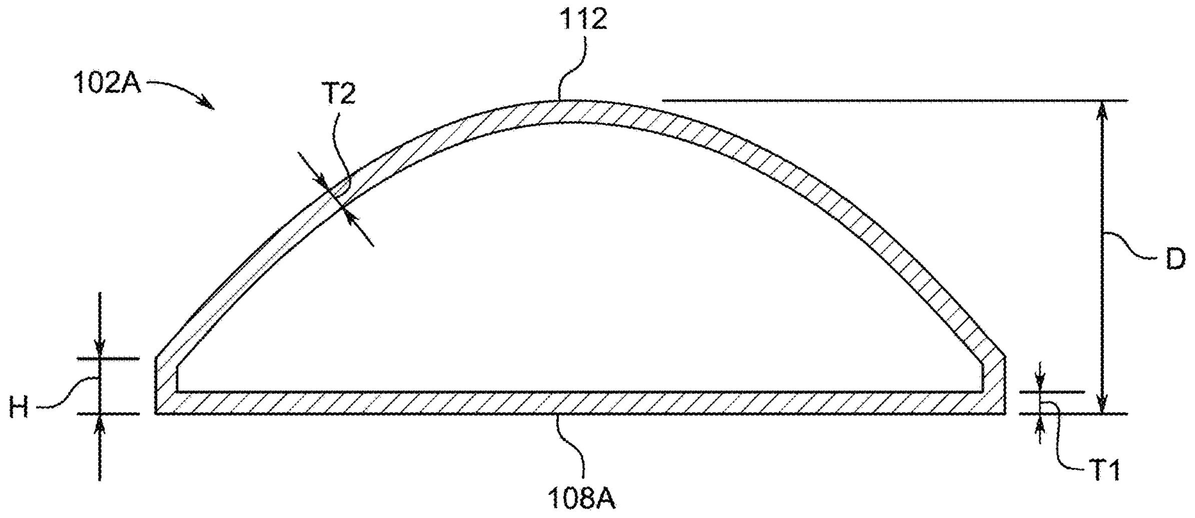
FIG. 1D illustrates a schematic side view of a lens of the array of dome-shaped lenses, according to certain embodiments.
Figure 1E:
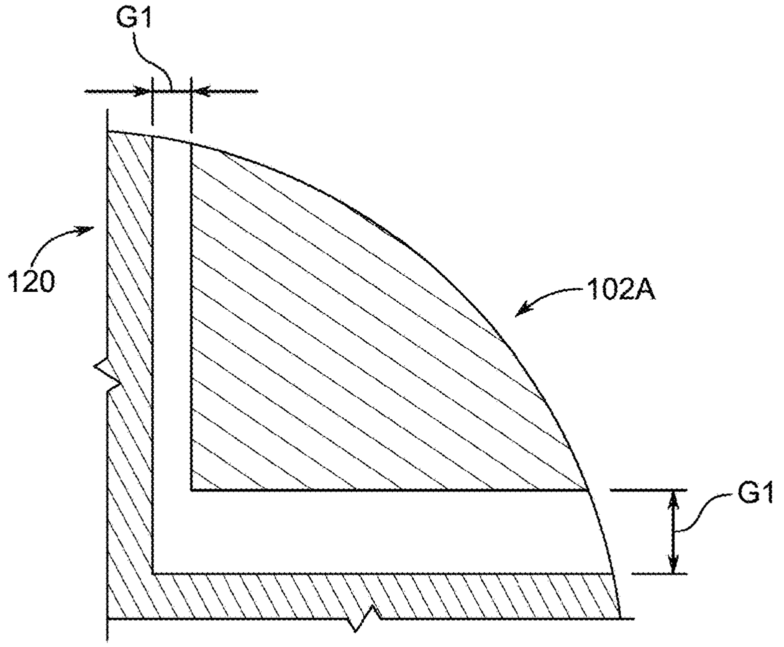
FIG. 1E illustrates a schematic segmented view of a lens of the array dome-shaped lenses, according to certain embodiments.

Referring to FIGS. 1C-1E, schematic diagrams of exemplary arrays of dome-shaped lenses are illustrated, according to certain embodiments. FIG. 1C depicts a schematic side view of the array of dome-shaped lenses 102 disposed on top of the photovoltaic panel 104. FIG. 1D depicts a schematic side view of a lens of the array of dome-shaped lenses 102, and FIG. 1E depicts a schematic segmented view of a lens of the array dome-shaped lenses 102. As described with respect to FIGS. 1A-1B, the array of dome-shaped lenses 102 is positioned above the light-gathering face 106 of the photovoltaic panel 104.

In general, the array of dome-shaped lenses 102 may be rectangular, triangular, circular, cylindrical, or polygonal. In some embodiments, the array of dome-shaped lenses 102 has the same configuration (e.g., shape, number of elements, etc.) as the photovoltaic element array. In some embodiments, the array of dome-shaped lenses 102 is configured as a rectangular array.

In some embodiments, the array of dome-shaped lenses 102 has a specific inter-lens spacing maintained between adjacent dome-shaped lenses within the array of dome-shaped lenses 102. In some embodiments, the inter-lens spacing may range from 0.5 mm to 5 mm. For example, the inter-lens spacing may be 0.5 mm, 0.75 mm, 1.0 mm, 1.25 mm, 1.5 mm, 1.75 mm, 2.0 mm, 2.25 mm, 2.5 mm, 2.75 mm, 3.0 mm, 3.25 mm, 3.5 mm, 3.75 mm, 4.0 mm, 4.25 mm, 4.5 mm, 4.75 mm, or 5.0 mm. The inter-lens spacing may be advantageous for accommodating manufacturing tolerances, potential thermal expansion of the lenses and support structure, installation/removal of individual lenses, increased airflow for cooling, ease of cleaning, assembly of the plurality of components included in the system 100, or some combination of these.

In general, the overall size and aspect ratio of the array of dome-shaped lenses 102 may be adapted, for instance, to match standard dimensions of the photovoltaic panel 104. In some embodiments, the array of dome-shaped lenses 102 may include 5 to 20 dome-shaped lenses disposed along a length 'L' and 2 to 10 dome-shaped lenses disposed along a width 'W', of the array of dome-shaped lenses 102. In an example, a smaller array might include 5 lenses along the length and 3 lenses along the width (5×3). A larger configuration may include 15 lenses along the length and 8 lenses along the width (15×8). Other exemplary array sizes may include, but are not limited to, 10×5, 20×10, 8×4, or 12×6 configurations, all falling within the disclosed range.

In some embodiments, an overall length-to-width ratio of the array of dome-shaped lenses 102 may range from 1:1 (square) to 3:1. An array with a 1:1 ratio may include, for example, 10 lenses along the length and 10 lenses along the width (10×10). An array exhibiting a 2:1 ratio may include, for example, 12 lenses along the length and 6 lenses along the width (12×6). An array approaching a 3:1 ratio may include, for example, 18 lenses by 6 lenses (18×6). These ratios may be advantageous for allowing a footprint of the array of dome-shaped lenses 102 to be adapted for various standard or custom sizes of the photovoltaic panel 104 and subsequent installation constraints.

In some embodiments, the array of dome-shaped lenses 102 includes a peripheral gap 'G1' between an array periphery and a photovoltaic panel frame 120. The peripheral gap may be advantageous for allowing thermal expansion, airflow facilitation, and modular integration within the photovoltaic panel frame 120. In some embodiments, the peripheral gap has a gap size of 8 mm to 30 mm. For example, the peripheral gap may have a size of 8.0 mm, 8.5 mm, 9.0 mm, 9.5 mm, 10.0 mm, 10.5 mm, 11.0 mm, 11.5 mm, 12.0 mm, 12.5 mm, 13.0 mm, 13.5 mm, 14.0 mm, 14.5 mm, 15.0 mm, 15.5 mm, 16.0 mm, 16.5 mm, 17.0 mm, 17.5 mm, 18.0 mm, 18.5 mm, 19.0 mm, 19.5 mm, 20.0 mm, 20.5 mm, 21.0 mm, 21.5 mm, 22.0 mm, 22.5 mm, 23.0 mm, 23.5 mm, 24.0 mm, 24.5 mm, 25.0 mm, 25.5 mm, 26.0 mm, 26.5 mm, 27.0 mm, 27.5 mm, 28.0 mm, 28.5 mm, 29.0 mm, 29.5 mm, or 30.0 mm. The peripheral gap may be useful for enabling passive convective cooling, where ambient air flows through the peripheral gap, dissipating excess heat that accumulates under the lens array. The peripheral gap may be useful for accommodating structural expansion due to temperature fluctuations, such that the array of dome-shaped lenses 102 remains positioned without introducing mechanical stress on the photovoltaic panel 104.

In some embodiments, the peripheral gap may be partially or fully sealed. Such sealing may be accomplished by using an elastic gasket, polymeric edge sealant, or ventilated mesh, depending on environmental exposure requirements for the system 100. In an example, for desert or high-humidity installations of the system 100, a hydrophobic microporous membrane may be used to allow air exchange and prevent moisture and dust ingress. In another example, for installations with high wind loads, the peripheral gap may incorporate mechanical securing elements, such as adjustable clips, locking grooves, and resilient compression seals to maintain structural integrity of the system 100 and the photovoltaic panel 104 integrated therein.

In addition, the peripheral gap may serve as a cable routing space for integration of electrical connections, sensor systems, or micro-inverters without interfering with the optical concentration function as provided in the system 100. In some embodiments, the peripheral gap may permit installation of thermal expansion joints, which ensures appropriate alignment of the array of dome-shaped lenses 102 under varying temperature conditions.

Referring to FIG. 1D, the array of dome-shaped lenses 102 may be disposed such that it forms a bottom gap 'G2' between a bottom surface 108A of the flat base 108 and an upper surface 106A of the light-gathering face 106. The bottom gap may be useful for airflow management, thermal insulation, and/or mechanical stability of the high-concentrating photovoltaic system 100. In some embodiments, the bottom gap has a gap size ranging from about 1 mm to 7.5 mm. For example, the bottom gap may have a size of 1.0 mm, 1.5 mm, 2.0 mm, 2.5 mm, 3.0 mm, 3.5 mm, 4.0 mm, 4.5 mm, 5.0 mm, 5.5 mm, 6.0 mm, 6.5 mm, 7.0 mm, or 7.5 mm. The bottom gap may be useful for permitting the formation of an insulating air layer that may passively reduce direct thermal conduction between the array of dome-shaped lenses 102 and the photovoltaic panel 104. The insulating air layer thermal may prevent excessive heat transfer, further mitigating localized thermal hotspots and preserving a high efficiency quotient of the photovoltaic panel 104.

In some embodiments, the bottom gap is maintained using spacers, adhesive bonding layers, or mechanical standoff structures. The spacers may be fabricated from low-thermal-conductivity materials, such as silicone rubber, fluoropolymer composites, and thermally insulated ceramic coatings, in order to further enhance temperature regulation. The bottom gap may also be configured to facilitate forced or passive air circulation, particularly in installations where active ventilation is used to augment cooling of the photovoltaic panel 104.

In some embodiments, the bottom gap may include optically engineered features in order to improve light utilization, such as light-scattering microstructures, wavelength-selective filters, or secondary reflective elements. In some embodiments, the bottom gap may function as an environmental protection mechanism, preventing moisture accumulation, particulate deposition, or thermal stress concentration at an interface between the flat base 108 and the light-gathering face 106. In some embodiments, a self-cleaning hydrophobic nanocoating may be applied to the bottom surface 108A of the flat base 108 and the upper surface 106A of the light-gathering face 106, reducing maintenance needs and improving long-term performance of the system 100. In some embodiments, the bottom gap may also allow for interchangeable lens configurations, where the array of dome-shaped lenses 102 and associated elements may be replaced or upgraded without direct adhesion to the photovoltaic panel 104, providing adaptability for different geographical locations, lighting conditions, or panel technologies.

Figure 2A:
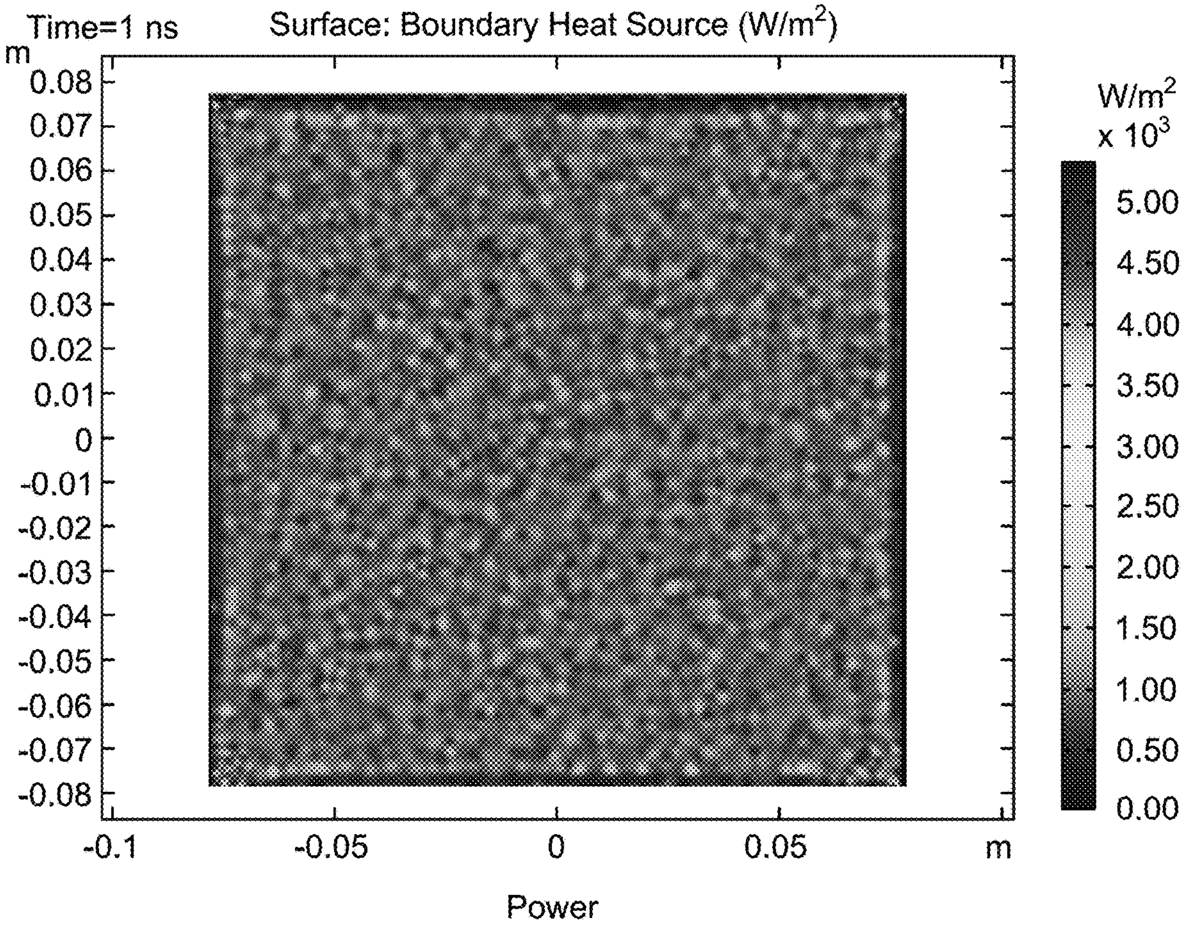
FIG. 2A is a graph depicting power simulated results for a bare cell, according to certain embodiments.
Figure 2B:
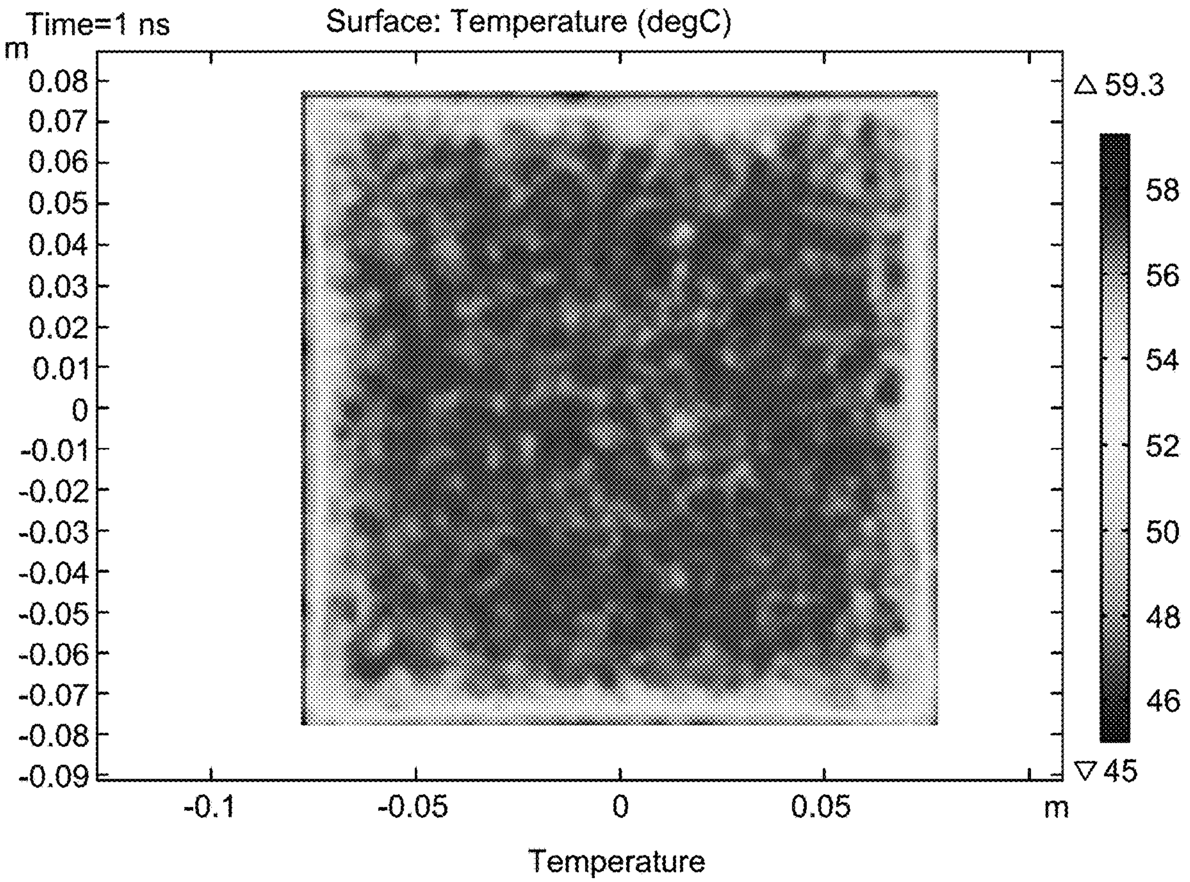
FIG. 2B is a graph depicting thermal simulated results for a bare cell, according to certain embodiments.
Figure 2C:
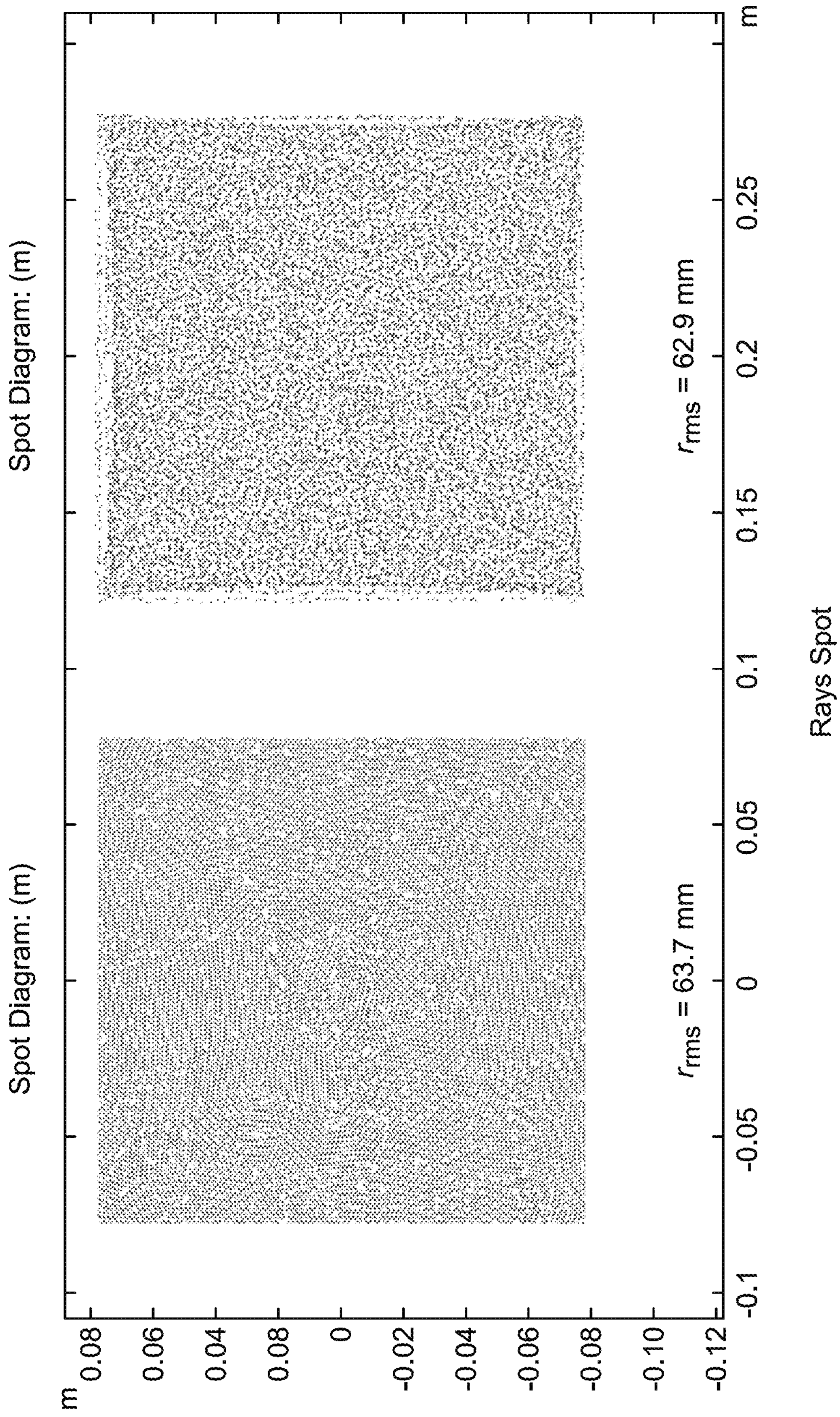
FIG. 2C is a graph depicting rays spot simulated results for a bare cell, according to certain embodiments.
Figure 3A:
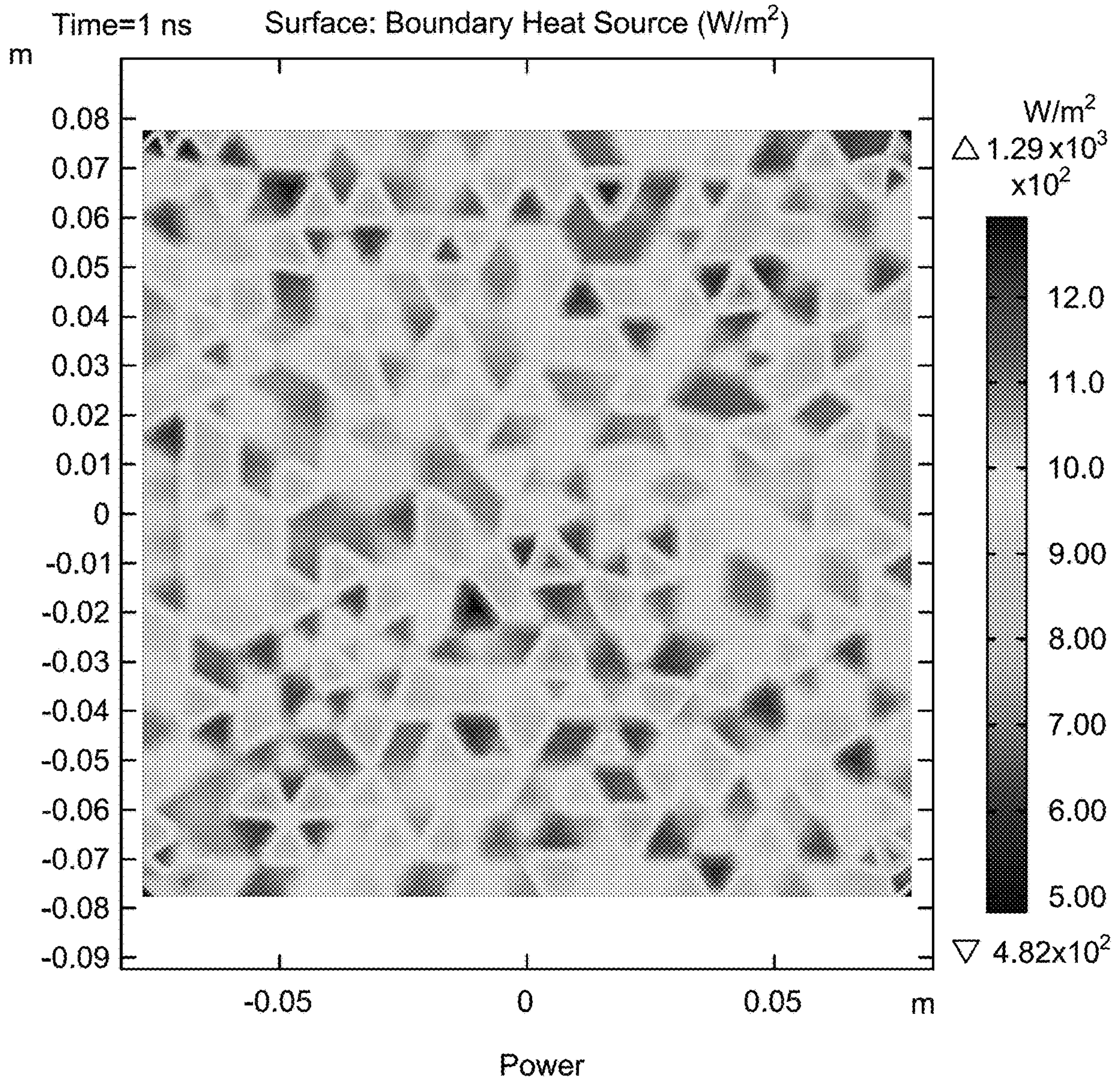
FIG. 3A is a graph depicting power simulated results for the high-concentrating photovoltaic system, according to certain embodiments.
Figure 3B:
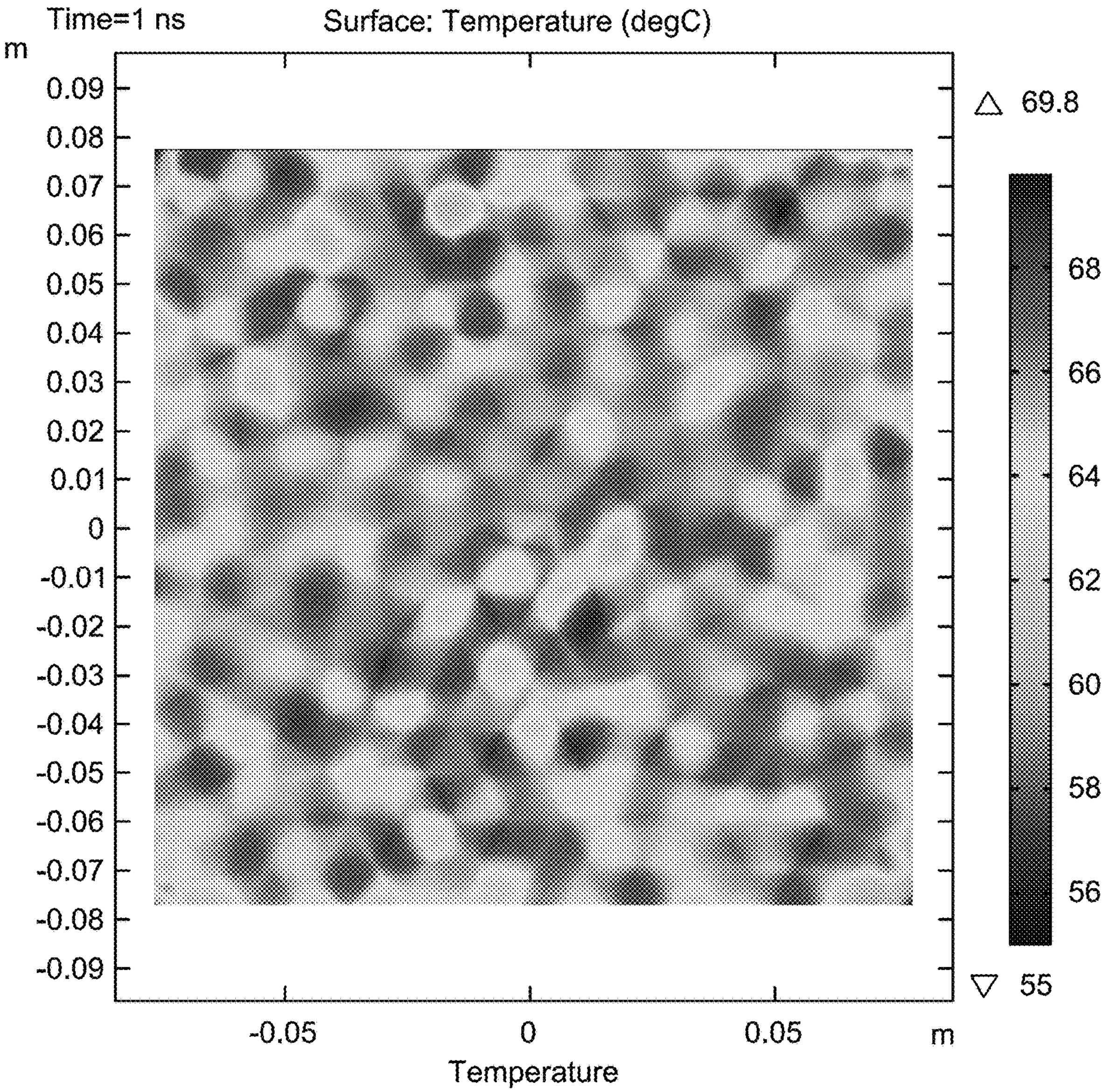
FIG. 3B is a graph depicting thermal simulated results for the high-concentrating photovoltaic system, according to certain embodiments.
Figure 3C:
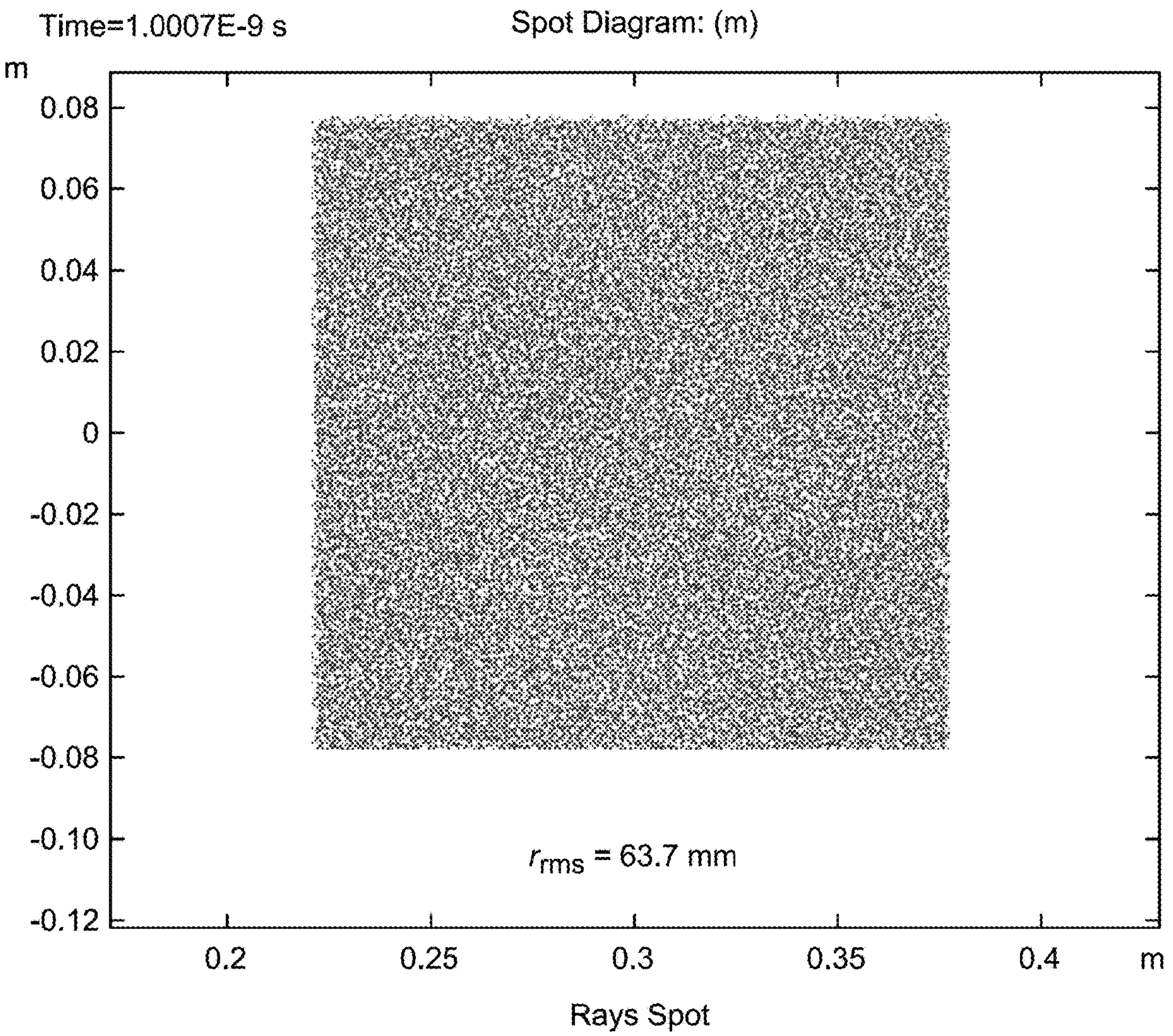
FIG. 3C is a graph depicting rays spot simulated results for the high-concentrating photovoltaic system, according to certain embodiments.

Referring to FIG. 2A-2C, thermal and power simulated results for a bare photovoltaic panel (without high-concentrating array of lenses) are depicted in graphical form. Further, referring to FIGS. 3A-3C, thermal and power simulated results for an exemplary high-concentrating photovoltaic system 100 are depicted, according to certain embodiments of the present disclosure. The high-concentrating photovoltaic system 100 has been simulated using a 3D numerical model COMOSL Multiphysics software. As can be seen from exemplary results depicted in FIGS. 3A-3C, the integration of the described array of dome-shaped lenses 102 enhanced the performance of the underlying photovoltaic panel 104. In particular, the system 102 achieves a concentration ratio of 1.25 suns to 7.5 suns. In accordance with the present disclosure, the enhancements brought in by the system 100 translates to an increased light intensity, incident on the photovoltaic cells beneath the array of dome-shaped lenses 104, the light intensity is about 1.25 to 7.5 times higher than standard solar irradiance (1 sun). Exemplary embodiments may achieve concentration ratios of 2 suns, 3.5 suns, 5 suns, or 7 suns, depending on the geometry of the array of dome-shaped lenses 102 and subsequent configuration.

In some embodiments, the concentration effect generated by the array of dome-shaped lenses 102 leads to an increased power output from the photovoltaic panel 104. In some embodiments, the high-concentrating photovoltaic system 102 exhibits a power density that is 110% to 200% of the power density achievable by the same photovoltaic panel operating without the array of dome-shaped lenses 102, when measured under operating temperatures ranging from 45° C. to 75° C. In an example, the system 100 might demonstrate a power density of 125% compared to the bare panel under the above specified conditions. In some embodiments, augmentation of a design of each lens included in the array of dome-shaped lenses 102 and subsequent configuration may yield power densities of 150%, 175%, or even up to 200% relative to a baseline performance within the specified temperature range. This enhancement may account for both the increased light concentration and potential thermal effects influencing efficiency of the photovoltaic panel 104.

The aspects of the present disclosure provide the high-concentrating photovoltaic system 100, particularly advantageous for improving solar energy conversion efficiency in a plurality of environmental conditions. The utilization of the array of dome-shaped lenses 102 with controlled internal gas pressure provides desirable light concentration onto the photovoltaic panel 104, which increases power density and concentration ratios. The system 100 as described herein may find utility in both residential and commercial solar energy installations, including rooftop arrays, solar farms, and portable power generation systems. The controlled parameters, such as lens dimensions, spacing, and internal gas pressure, permits adaptability to diverse climatic conditions, including high-temperature environments, where conventional photovoltaic systems may suffer performance degradation. The incorporation of anti-soiling coatings further enhances a longevity and efficiency of the system 100 by mitigating the impact of environmental contaminants. The system 100 as described herein offers potential advantages of increased energy output, reduced footprint for equivalent power generation, and improved operational stability, further contributing to advancement of sustainable energy solutions.

Numerous modifications and variations of the present disclosure are possible in light of the above teachings. It is therefore to be understood that within the scope of the appended claims, the invention may be practiced otherwise than as specifically described herein.

The invention claimed is:

1. A high-concentrating photovoltaic system, comprising a photovoltaic panel; and an array of dome-shaped lenses disposed above a light-gathering face of the photovoltaic panel, wherein each dome-shaped lens includes a flat base and a domed upper portion defining a lens interior;

each lens interior is air-tight and contains a gas at a pressure of from greater than 0 to 25 kPa.

2. The high-concentrating photovoltaic system of claim 1, wherein each lens interior contains a gas at a pressure of from greater than 0 to 10 kPa.

3. The high-concentrating photovoltaic system of claim 1, wherein the flat base and domed upper portion each have a thickness of 2 to 10 mm.

4. The high-concentrating photovoltaic system of claim 1, wherein each dome-shaped lens has a dome height of 40 of 70 mm as measured from a bottom surface of the flat base.

5. The high-concentrating photovoltaic system of claim 1, wherein the array is a rectangular array having an inter-lens spacing between each adjacent dome-shaped lens of 0.5 to 5 mm.

6. The high-concentrating photovoltaic system of claim 1, wherein each dome-shaped lens includes a straight wall disposed between the flat base and the domed upper portion about a periphery of the flat base such that the domed upper portion is separated from the flat base by a height of the straight wall.

7. The high-concentrating photovoltaic system of claim 6, wherein the height of the straight wall is 5 to 25 mm.

8. The high-concentrating photovoltaic system of claim 1, wherein the array has a peripheral gap between an array periphery and a photovoltaic panel frame.

9. The high-concentrating photovoltaic system of claim 8, wherein the peripheral gap has a gap size of 8 to 30 mm.

10. The high-concentrating photovoltaic system of claim 1, having a power density of 110 to 200% of a power density of the photovoltaic panel without the array of dome-shaped lenses at a temperature of 45 to 75° C.

11. The high-concentrating photovoltaic system of claim 1, having a concentration ratio of 1.25 to 7.5 suns.

12. The high-concentrating photovoltaic system of claim 1, wherein the array includes 5 to 20 dome-shaped lenses disposed along a length of the array.

13. The high-concentrating photovoltaic system of claim 1, wherein the array includes 2 to 10 dome-shaped lenses disposed along a width of the array.

14. The high-concentrating photovoltaic system of claim 1, wherein the array has a length to width ratio of 1:1 to 3:1.

15. The high-concentrating photovoltaic system of claim 1, wherein the array of dome-shaped lenses is disposed above the light-gathering face of the photovoltaic panel to form a bottom gap between a bottom surface of the flat base and an upper surface of the light-gathering face.

16. The high-concentrating photovoltaic system of claim 15, wherein the bottom gap has a size of 1 to 7.5 mm.

17. The high-concentrating photovoltaic system of claim 1, wherein each dome-shaped lens has a length to width ratio of 1:1 to 3:1.

18. The high-concentrating photovoltaic system of claim 1, wherein each dome-shaped lens has an anti-soiling coating disposed on an exterior surface of the dome-shaped lens.

19. The high-concentrating photovoltaic system of claim 18, wherein the anti-soiling coating comprises an organosilane.

20. The high-concentrating photovoltaic system of claim 1, wherein each dome-shaped lens is formed of a glass.

* * * * *